(12) United States Patent
Obara et al.

(10) Patent No.: US 7,476,425 B2
(45) Date of Patent: Jan. 13, 2009

(54) WIDE-VIEWING ANGLE COMPENSATION FILM AND TRANSMISSION TYPE LIQUID-CRYSTAL DISPLAY EMPLOYING THE SAME

(75) Inventors: Naoto Obara, Mie (JP); Shinsuke Toyomasu, Mie (JP)

(73) Assignee: Tosoh Corporation, Shunan-shi (JP)

( * ) Notice: Subject to any disclaimer, the term of this patent is extended or adjusted under 35 U.S.C. 154(b) by 346 days.

(21) Appl. No.: 11/277,102

(22) Filed: Mar. 21, 2006

(65) Prior Publication Data
US 2006/0216436 A1 Sep. 28, 2006

(30) Foreign Application Priority Data
Mar. 25, 2005 (JP) ............................. 2005-088595

(51) Int. Cl.
*G02F 1/13363* (2006.01)
(52) U.S. Cl. .................... 428/1.31; 349/96; 349/118; 349/120
(58) Field of Classification Search .............. 428/1.3, 428/1.31; 349/117–118, 96, 120
See application file for complete search history.

(56) References Cited

U.S. PATENT DOCUMENTS

| 2002/0149726 A1* | 10/2002 | Yano et al. | 349/117 |
| 2004/0001175 A1* | 1/2004 | Ito | 349/117 |
| 2004/0063887 A1* | 4/2004 | Toyomasu et al. | 526/307.2 |
| 2004/0190138 A1* | 9/2004 | Toyomasu et al. | 359/494 |
| 2005/0185124 A1* | 8/2005 | Kadoya | 349/117 |

FOREIGN PATENT DOCUMENTS

| CN | 1374549 A | 10/2002 |
| CN | 1569949 A | 1/2005 |
| JP | 4-305602 | 10/1992 |
| JP | 2004-157523 | 6/2004 |
| JP | 2004-269842 | 9/2004 |
| JP | 2004-315788 | 11/2004 |

* cited by examiner

*Primary Examiner*—Keith D. Hendricks
*Assistant Examiner*—Sophie Hon
(74) *Attorney, Agent, or Firm*—Oblon, Spivak, McClelland, Maier & Neustadt, P.C.

(57) ABSTRACT

A wide-viewing angle compensation film contains a polarizing plate and an optical compensation film which exhibits negative birefringence and has an in-plane retardation (Re1) of 60-220 nm and an orientation parameter (Nz) in the range of 0±0.05, the optical compensation film exhibiting negative birefringence and the polarizing plate being stacked so that the slow axis of the compensation film is perpendicular or parallel to the absorption axis of the polarizing plate; and a transmission type liquid-crystal display contains a liquid-crystal cell and the wide-viewing angle compensation film disposed on at least one side of the cell.

4 Claims, 2 Drawing Sheets

WIDE-VIEWING ANGLE COMPENSATION FILM AND TRANSMISSION TYPE LIQUID-CRYSTAL DISPLAY EMPLOYING THE SAME

FIELD OF THE INVENTION

The present invention relates to a wide-viewing angle compensation film and a transmission type liquid-crystal display employing the same. More particularly, the invention relates to a wide-viewing angle compensation film which comprises an optical compensation film exhibiting negative birefringence and a polarizing plate, and to a transmission type liquid-crystal display which employs the wide-viewing angle compensation film and has a wide viewing angle.

BACKGROUND OF THE INVENTION

Liquid-crystal display elements which have been developed for use in transmission type liquid-crystal displays include a twisted nematic liquid crystal (TN-LCD), super-twisted nematic liquid crystal (STN-LCD), twisted nematic liquid crystal (TFT-TN-LCD) utilizing a thin-film transistor (TFT), vertical-alignment liquid crystal (VA-LCD), and in-plane switching liquid crystal (IPS-LCD).

These transmission type liquid-crystal displays comprise a liquid-crystal cell formed by sandwiching a liquid-crystal element between glass substrates and polarizing plates disposed respectively on the upper and lower sides of the cell. The polarizing plates have been disposed so that the absorption axes thereof are perpendicular to each other in order that the display, when viewed from a front direction for the polarizing plates, might have a light transmittance of almost 0% to thereby make the orientation of the liquid crystal visually recognizable. However, there has been the following problem. When this display is viewed from directions which are oblique to the front direction and make an azimuth of 45° with the directions of the absorption axes of the polarizing plates, then the polarized light which has passed through the entrance-side polarizing plate is not sufficiently absorbed by the emission-side polarizing plate and light leakage hence occurs, resulting in a narrowed viewing angle.

In recent years, the desire for an improvement in image quality is growing simultaneously with the enlargement of the market for transmission type liquid-crystal displays. In particular, there is a desire for an improvement in image quality and widening of a viewing angle by compensating for the geometrical axial shifting of polarizing plates because polarizing plates are employed in all transmission type liquid-crystal displays.

The relationship between a polarizing plate and/or optical compensation film and viewing angle is shown in FIG. 1. In FIG. 1, (a) indicates a direction normal to the plane of the polarizing plate and/or optical compensation film; (b) indicates the direction of the slow axis of the optical compensation film which has been oriented by stretching; (c) indicates an elevation angle with respect to the plane of the polarizing plate and/or optical compensation film; and (d) indicates an azimuth on the plane of the polarizing plate and/or optical compensation film.

The geometrical axial shifting of polarizing plates is a phenomenon in which when a liquid-crystal display comprising a liquid-crystal cell and a pair of polarizing plates disposed respectively on the upper and lower sides of the cell so that their absorption axes are perpendicular to each other is viewed from a direction which is oblique to the optical axis for the polarizing plates and is different from the directions of the absorption axes of the polarizing plates, then light leakage occurs and this results in a narrowed viewing angle. For example, when the liquid-crystal display is viewed from directions forming an azimuth of 45° with the absorption axes of the polarizing plates and forming various elevation angles with the direction normal to the polarizing plates, then the angle between the absorption axes of the polarizing plates disposed respectively on the upper and lower sides of the liquid-crystal cell is 90° or larger and, hence, light leakage occurs, resulting in a narrowed viewing angle.

A polarizing plate compensating for such geometrical axial shifting of polarizing plates which is observed in viewing from oblique directions was proposed. This polarizing plate employs a sealing film showing retardation as a transparent protective film for the polarizer (see, for example, JP-A-04-305602 (the term "JP-A" as used herein means an "unexamined published Japanese patent application")). It has also been proposed to stack a polarizing plate and a retardation film exhibiting positive birefringence (see, for example, JP-A-2004-157523).

Positive birefringence means the property of having such refractive-index anisotropy that a film which has been stretched to cause molecular chains of the polymer as a component of the film to undergo molecular orientation has an increased refractive index in the direction parallel to the stretching direction. On the other hand, negative birefringence means the property of having such refractive-index anisotropy that a film which has been stretched to cause molecular chains of the polymer as a component of the film to undergo molecular orientation has a reduced refractive index in the direction parallel to the stretching direction and simultaneously has an increased refractive index in the direction perpendicular to the stretching direction.

However, the proposal in JP-A-04-305602 has had drawbacks, for example, that the sealing film used as a transparent protective film for a polarizer is difficult to adhere to the polarizer in production. The proposal in JP-A-2004-157523 has had drawbacks, for example, that it necessitates a stretching technique which is not for producing a mere uniaxially stretched film but for controlling orientation in film in-plane directions and the film thickness direction as used in the Examples and it is difficult to stably orient in in-plane directions of the film and the film thickness direction, and that the stretching is costly. Furthermore, there has been a drawback that when a liquid-crystalline polymer is used, it is difficult to evenly orient it and to evenly impart the property of performing optical compensation.

SUMMARY OF THE INVENTION

The invention has been achieved under the circumstances described above. An object of the invention is to provide a wide-viewing angle compensation film which has excellent heat resistance and can compensate for the geometrical axial shifting of polarizing plates for use in a transmission type liquid-crystal display to thereby widen the viewing angle. Another object of the invention is to provide a transmission type liquid-crystal display employing this wide-viewing angle compensation film.

The present inventors made intensive investigations on the problems described above. As a result, they have found that the viewing angle of a polarizing plate can be widened by compensating for the axial shifting of the polarizing plate for use in a transmission type liquid-crystal display by stacking a specific optical compensation film on the polarizing plate under specific conditions. The invention has been thus completed.

The invention provides a wide-viewing angle compensation film comprising a polarizing plate and an optical compensation film which exhibits negative birefringence and has an in-plane retardation (Re1) as represented by the following equation (1) of 60-220 nm and an orientation parameter (Nz) as represented by the following equation (2) in the range of 0±0.05, the optical compensation film exhibiting negative birefringence and the polarizing plate being stacked so that the slow axis of the compensation film is perpendicular or parallel to the absorption axis of the polarizing plate. The invention further provides a transmission type liquid-crystal display employing the wide-viewing angle compensation film.

$$Re1=(nx1-ny1)\times d1 \qquad (1)$$

$$Nz=(nx1-nz1)/(nx1-ny1) \qquad (2)$$

(In equations (1) and (2), $nx1$, $ny1$, and $nz1$ respectively represent the x-axis-direction refractive index, y-axis-direction refractive index, and z-axis-direction refractive index of the optical compensation film, provided that the x axis is an in-plane direction of the film parallel to the slow axis of the film, the y axis is an in-plane direction of the film perpendicular to the x axis, and the z axis is an out-of-plane direction of the film perpendicular to the x axis; and $d1$ represents the thickness of the optical compensation film.)

Figure 1:
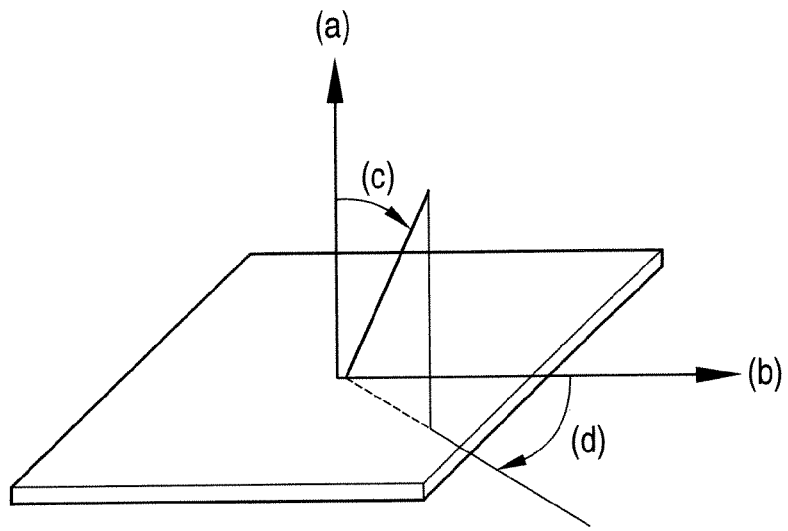
FIG. 1 is a view showing an angle of elevation and an azimuth which are used for indicating the viewing angle of a polarizing plate or an optical compensation film.

DESCRIPTION OF REFERENCE NUMERALS AND SIGNS (a): Direction normal to the plane of polarizing plate and/or optical compensation film (b): Direction of the slow axis of optical compensation film oriented by stretching (c): Elevation angle with respect to the plane of polarizing plate and/or optical compensation film (d): Azimuth on the plane of polarizing plate and/or optical compensation film (e): Wide-viewing angle compensation film in which the absorption axis of polarizing plate is perpendicular to the slow axis of optical compensation film (f): Wide-viewing angle compensation film in which the absorption axis of polarizing plate is parallel to the slow axis of optical compensation film (g): Transmission type liquid-crystal display including, disposed on viewing side, wide-viewing angle compensation film in which the absorption axis of polarizing plate is perpendicular to the slow axis of optical compensation film (h): Transmission type liquid-crystal display including, disposed on light entrance side, wide-viewing angle compensation film in which the absorption axis of polarizing plate is perpendicular to the slow axis of optical compensation film (i): Transmission type liquid-crystal display including, disposed on viewing side, wide-viewing angle compensation film in which the absorption axis of polarizing plate is parallel to the slow axis of optical compensation film (j): Transmission type liquid-crystal display including, disposed on light entrance side, wide-viewing angle compensation film in which the absorption axis of polarizing plate is parallel to the slow axis of optical compensation film

1: Transparent protective film
2: Polarizer
3: Optical compensation film
4: Polarizing plate
5: Wide-viewing angle compensation film
LC: Liquid-crystal cell

DETAILED DESCRIPTION OF THE INVENTION

The invention will be explained below in detail.

The wide-viewing angle compensation film of the invention is a laminate which comprises an optical compensation film exhibiting negative birefringence and having an in-plane retardation (Re1) of 60-220 nm and an orientation parameter (Nz) in the range of 0±0.05 and a polarizing plate stacked thereon so that the slow axis of the compensation film is perpendicular or parallel to the absorption axis of the polarizing plate.

The absorption axis of a polarizing plate is the axial direction in which a light incident on the polarizing plate is absorbed or dispersed when it passes through the polarizer while being divided into two polarized light components perpendicular to each other. The slow axis of an optical compensation film is the in-plane axial direction of the film in which the film has a high refractive index. In the invention, the optical compensation film exhibiting negative birefringence and the polarizing plate are stacked so that the slow axis and the absorption axis are perpendicular or parallel to each other, whereby the compensation film attains a wide viewing angle. When the compensation film and the polarizing plate are stacked so that the slow axis and the absorption axis are neither perpendicular nor parallel, it is difficult to compensate so as to attain a wide viewing angle.

The optical compensation film exhibiting negative birefringence which is a component of the wide-viewing angle compensation film of the invention is one which, when an in-plane direction of the film parallel to the slow axis of the optical compensation film is referred to as the x axis, an in-plane direction of the film perpendicular to the x axis is referred to as the y axis, and an out-of-plane direction of the film perpendicular to the x axis is referred to as the z axis, has an in-plane retardation (Re1) as represented by equation (1) of 60-220 nm, provided that $nx1$, $ny1$, and $nz1$ are the x-axis-direction refractive index, y-axis-direction refractive index, and z-axis-direction refractive index, respectively, and $d1$ is the thickness of the optical compensation film. In case where the optical compensation film is one having an Re1 less than 60 nm or exceeding 220 nm, it is difficult to compensate for the geometrical axial shifting of the polarizing plate and to attain a wide viewing angle. Furthermore, this optical compensation film has an orientation parameter (Nz) as represented by equation (2) in the range of 0±0.05. In case where the Nz of the film is outside the range of 0±0.05, it is difficult in this case also to compensate for the geometrical axial shifting of the polarizing plate and to attain a wide viewing angle. The optical compensation film preferably is one in which the relationship among the three-dimensional refractive indices satisfies $nx1 \geq nz1 > ny1$ or $nz1 \geq nx1 > ny1$.

Any film can be used as the optical compensation film exhibiting negative birefringence, which is a component of the wide-viewing angle compensation film of the invention, as long as it falls under the category of optical compensation films exhibiting negative birefringence. Examples thereof include a uniaxially stretched poly(methyl methacrylate) film, biaxially stretched poly(methyl methacrylate) film, uniaxially stretched N-(2-methylphenyl)maleimide/isobutene copolymer film, biaxially stretched N-(2-methylphenyl)maleimide/isobutene copolymer film, uniaxially stretched film of a resin composition comprising an N-phenylmaleimide/isobutene copolymer and an acrylonitrile/styrene copolymer, and biaxially stretched film of a resin composition comprising an N-phenylmaleimide/isobutene copolymer and an acrylonitrile/styrene copolymer. Preferred of these is a uniaxially stretched and/or biaxially stretched film exhibiting negative birefringence which comprises 20-95% by weight copolymer (a) comprising olefin residual units represented by the following formula (i) and N-phenyl-substituted maleimide residual units represented by the following formula (ii) and having a weight-average molecular weight as calculated for standard polystyrene of $5 \times 10^3 - 5 \times 10^6$ and 80-5% by weight acrylonitrile/styrene copolymer (b) having a proportion of acrylonitrile residual units to styrene residual units of from 20:80 to 50:50 (by weight) and a weight-average molecular weight as calculated for standard polystyrene of $5 \times 10^3 - 5 \times 10^6$, and which has a glass transition temperature of 130° C. or higher. This film is preferred because it enables the wide-viewing angle compensation film to be excellent especially in heat resistance.

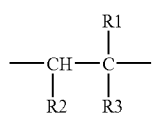

(i)

(In formula (i), R1, R2, and R3 each independently are hydrogen or an alkyl group having 1-6 carbon atoms.)

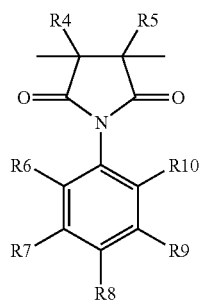

(ii)

(In formula (ii), R4 and R5 each independently are hydrogen or a linear or branched alkyl group having 1-8 carbon atoms, and R6, R7, R8, R9, and R10 each independently is hydrogen, a halogen element, a carboxylic acid, a carboxylic acid ester, a hydroxyl group, a cyano group, a nitro group, or a linear or branched alkyl group having 1-8 carbon atoms.)

The copolymer (a), which is a preferred example of constituent materials for the optical compensation film exhibiting negative birefringence to be used in the wide-viewing angle compensation film of the invention, will be explained below in detail.

The copolymer (a) is a copolymer comprising olefin residual units represented by formula (i) and N-phenyl-substituted maleimide residual units represented by formula (ii). It preferably is a copolymer in which the proportion of olefin residual units represented by formula (i) to N-phenyl-substituted maleimide residual units represented by formula (ii) is from 49:51 to 35:65 (by mole), because this copolymer enables the formation of an optical compensation film excellent especially in toughness. The weight-average molecular weight of this copolymer, as calculated for standard polystyrene, is preferably $5 \times 10^3 - 5 \times 10^6$. The weight-average molecular weight can be determined by analyzing the copolymer by gel permeation chromatography (hereinafter referred to as GPC) to obtain an elution curve and converting the curve to values for standard polystyrene.

R1, R2, and R3 in the olefin residual units represented by formula (i), which are contained in the copolymer (a), each independently are hydrogen or an alkyl group having 1-6 carbon atoms. Examples of the alkyl group having 1-6 carbon atoms include methyl, ethyl, n-propyl, isopropyl, n-butyl, s-butyl, t-butyl, n-pentyl, 2-pentyl, n-hexyl, and 2-hexyl. Examples of compounds from which the olefin residual units represented by formula (i) can be derived include isobutene, 2-methyl-1-butene, 2-methyl-1-pentene, 2-methyl-1-hexene, 2-methyl-1-heptene, 1-isooctene, 2-methyl-1-octene, 2-ethyl-1-pentene, 2-methyl-2-pentene, 2-methyl-2-hexene, ethylene, propylene, 1-butene, and 1-hexene. Preferred of these are the olefins belonging to 1,2-di-substituted olefins. In particular, isobutene is preferred because it gives a copolymer (a) excellent in heat resistance, transparency, and mechanical properties. The olefin residual units may consist of units of one kind or may comprise a combination of two or more kinds of units. The proportions thereof are not particularly limited.

R4 and R5 in the N-phenyl-substituted maleimide residual units represented by formula (ii), which are contained in the copolymer (a), each independently are hydrogen or a linear or branched alkyl group having 1-8 carbon atoms. Examples of the linear or branched alkyl group having 1-8 carbon atoms include methyl, ethyl, n-propyl, isopropyl, n-butyl, s-butyl, t-butyl, n-pentyl, 2-pentyl, n-hexyl, 2-hexyl, n-heptyl, 2-heptyl, 3-heptyl, n-octyl, 2-octyl, and 3-octyl. R6, R7, R8, R9, and R10 each independently is hydrogen, a halogen element, a carboxylic acid, a carboxylic acid ester, a hydroxyl group, a cyano group, a nitro group, or a linear or branched alkyl group having 1-8 carbon atoms. Examples of the halogen element include fluorine, bromine, chlorine, and iodine. Examples of the carboxylic acid ester include methyl carboxylate and ethyl carboxylate. Examples of the linear or branched alkyl group having 1-8 carbon atoms include methyl, ethyl, n-propyl, isopropyl, n-butyl, s-butyl, t-butyl, n-pentyl, 2-pentyl, n-hexyl, 2-hexyl, n-heptyl, 2-heptyl, 3-heptyl, n-octyl, 2-octyl, and 3-octyl.

Examples of compounds from which the N-phenyl-substituted maleimide residual units represented by formula (ii) can be derived include N-substituted maleimide compounds in which the substituent introduced to the nitrogen atom is unsubstituted phenyl or a substituted phenyl group. Specific examples thereof include N-phenylmaleimide, N-(2-methylphenyl)maleimide, N-(2-ethylphenyl)maleimide, N-(2-n-propylpheny)maleimide, N-(2-isopropylphenyl)maleimide, N-(2-n-butylphenyl)maleimide, N-(2-sec-butylphenyl)maleimide, N-(2-t-butylphenyl)maleimide, N-(2-n-pentylphenyl)maleimide, N-(2-t-pentylphenyl)maleimide, N-(2,6-dimethylphenyl)maleimide, N-(2,6-diethylphenyl)maleimide, N-(2,6-di-n-propylphenyl)maleimide, N-(2,6-diisopropylphenyl)maleimide, N-(2-methyl-6-ethylphenyl)maleimide, N-(2-methyl-6-isopropylphenyl)maleimide, N-(2-chlorophenyl)maleimide, N-(2-bromophenyl)maleimide, N-(2,6-dichlorophenyl)maleimide, N-(2,6-dibromophenyl)maleimide, N-(2-biphenyl)maleimide, N-(2-diphenyl ether)maleimide, N-(2-cyanophenyl)maleimide, N-(2- nitrophenyl)maleimide, N-(2,4,6-trimethylphenyl)maleimide, N-(2,4-dimethylphenyl)maleimide, N-perbromophenylmaleimide, N-(2-methyl-4-hydroxyphenyl)maleimide, and N-(2,6-diethyl-4-hydroxyphenyl)maleimide. Preferred of these are N-phenylmaleimide, N-(2-methylphenyl)maleimide, N-(2-ethylphenyl)maleimide, N-(2-n-propylphenyl)maleimide, N-(2-isopropylphenyl)maleimide, N-(2-n-butylphenyl)maleimide, N-(2-sec-butylphenyl)maleimide, N-(2-t-butylphenyl)maleimide, N-(2-n-pentylphenyl)maleimide, N-(2-t-pentylphenyl)maleimide, N-(2,6-dimethylphenyl)maleimide, N-(2,6-diethylphenyl)maleimide, N-(2,6-di-n-propylphenyl)maleimide, N-(2,6-diisopropylphenyl)maleimide, N-(2-methyl-6-ethylphenyl)maleimide, N-(2-methyl-6-isopropylphenyl)maleimide, N-(2-chlorophenyl)maleimide, N-(2-bromophenyl)maleimide, N-(2,6-dichlorophenyl)maleimide, N-(2,6-dibromophenyl)-maleimide, N-(2-biphenyl)maleimide, N-(2-diphenyl ether)maleimide, N-(2-cyanophenyl)maleimide, and N-(2-nitrophenyl)maleimide. In particular, N-phenylmaleimide and N-(2-methylphenyl)maleimide are preferred because they give a copolymer (a) excellent also in heat resistance, transparency, and mechanical properties. The N-phenyl-substituted maleimide residual units may consist of units of one kind or may comprise a combination of two or more kinds of units. The proportions thereof are not particularly limited.

The copolymer (a) can be obtained by copolymerizing a compound capable of giving olefin residual units represented by formula (i) and a compound capable of giving N-phenyl-substituted maleimide residual units represented by formula (ii) by a known polymerization technique. Examples of the known polymerization technique include bulk polymerization, solution polymerization, suspension polymerization, and emulsion polymerization. In another method, a copolymer obtained by copolymerizing a compound capable of giving olefin residual units represented by formula (i) with maleic anhydride is reacted with, e.g., aniline or an aniline having one or more substituents introduced in any of the 2- to 6-positions to conduct a dehydrating cyclization imidization reaction and thereby obtain the target copolymer.

Examples of the copolymer (a), which is a copolymer comprising olefin residual units represented by formula (i) and N-phenyl-substituted maleimide residual units represented by formula (ii), include N-phenylmaleimide/isobutene copolymers, N-phenylmaleimide/ethylene copolymers, N-phenylmaleimide/2-methl-1-butene copolymers, N-(2-methylphenyl)maleimide/isobutene copolymers, N-(2-methylphenyl)maleimide/ethylene copolymers, N-(2-methylphenyl)maleimide/2-methyl-1-butene copolymers, N-(2-ethylphenyl)maleimide/isobutene copolymers, N-(2-ethylphenyl)maleimide/ethylene copolymers, and N-(2-ethylphenyl)maleimide/2-methyl-1-butene copolymers. Especially preferred of these are N-phenylmaleimide/isobutene copolymers and N-(2-methylphenyl)maleimide/isobutene copolymers because these are excellent also in heat resistance, transparency, and mechanical properties.

The acrylonitrile/styrene-based copolymer (b), which is a preferred example of constituent materials for the optical compensation film exhibiting negative birefringence to be used in the wide-viewing angle compensation film of the invention, will be explained below in detail.

The acrylonitrile/styrene-based copolymer (b) preferably is one in which the proportion of acrylonitrile residual units to styrene residual units is from 20:80 to 50:50 (by weight) because this copolymer shows excellent moldability in forming the optical compensation film exhibiting negative birefringence and enables the film to be excellent in hue and mechanical strength. In particular, the proportion of acrylonitrile residual units to styrene residual units is preferably from 36:64 to 50:50 (by weight) because an optical compensation film further having excellent toughness can be formed from this copolymer. The copolymer (b) preferably is an acrylonitrile/styrene copolymer and/or an acrylonitrile/butadiene/styrene copolymer which each have a weight-average molecular weight as calculated for standard polystyrene of $5 \times 10^3 – 5 \times 10^6$. The weight-average molecular weight can be determined by analyzing the copolymer by GPC to obtain an elution curve and converting the curve to values for standard polystyrene.

For synthesizing the acrylonitrile/styrene-based copolymer (b), known polymerization techniques can be used. For example, the copolymer can be produced by bulk polymerization, solution polymerization, suspension polymerization, emulsion polymerization, or the like. The copolymer may be a commercially available product.

In forming the optical compensation film exhibiting negative birefringence, it is preferred to use the copolymer (a) and the acrylonitrile/styrene-based copolymer (b) in amounts of 20-95% by weight and 80-5% by weight, respectively, because such proportions enable the film to have an excellent balance especially between heat resistance and mechanical properties. More preferably, the film comprises 20-85% by weight the copolymer (a) and 80-15% by weight the acrylonitrile/styrene-based copolymer (b).

The optical compensation film exhibiting negative birefringence can be prepared, for example, by forming the resins, a resin composition, or the like into a film and subjecting this film to stretching/orientation. For the film formation can be used a molding technique such as, for example, extrusion molding or solution casting. For stretching the film to orient molecular chains, various techniques can be used, such as, for example, stretching, rolling, and hauling. Of these, stretching is preferred for use in the production because it enables the optical compensation film to be highly efficiently produced. Examples of techniques usable for this stretching include stretching methods such as free-width uniaxial stretching and constant-width uniaxial stretching. Furthermore, a roll stretcher or the like is also known as an apparatus for conducting rolling, etc. Usable besides these are a tenter type stretching machine, a tensile tester as a small stretching apparatus for experimental use, a uniaxially stretching machine, a stretching machine for successive biaxial stretching, and a stretching machine for simultaneously biaxial stretching. In the case of using a biaxially stretching machine, both of uniaxial stretching and biaxial stretching are possible.

The polarizing plate as a component of the wide-viewing angle compensation film of the invention may be one which is generally known as a polarizing plate and comprises a polarizer and a transparent protective film stacked on at least one side thereof. It may be a commercial product.

The polarizer is not particularly limited and may be a known one. Examples of the polarizer include one obtained by adsorbing a dichroic substance such as iodine or a dichroic dye onto a hydrophilic polymer film such as a poly(vinyl alcohol)-based film or a partly saponified ethylene/vinyl acetate copolymer-based film and then uniaxially stretching the film. Examples thereof further include oriented polyene-based films. Preferred of these is the polarizer comprising a poly(vinyl alcohol)-based film and a dichroic substance such as iodine. The thickness of the polarizer is not particularly limited and is generally about 5-40 μm.

The transparent protective film may be a generally known one. Examples thereof include films made of: polyester-based polymers such as poly(ethylene terephthalate) and poly(ethylene naphthalate); cellulosic polymers such as diacetyl cellulose and triacetyl cellulose; acryl-based polymers such as poly(methyl methacrylate); styrene-based polymers such as polystyrene and acrylonitrile/styrene copolymers; olefin-based polymers such as polyethylene, polypropylene, polyolefins having a cyclic or norbornene structure, and ethylene/propylene copolymers; polycarbonate-based polymers; vinyl chloride-based polymers; amide-based polymers such as nylons and aromatic polyamides; imide-based polymers; sulfone-based polymers; poly(ether sulfone)-based polymers; polyetheretherketone-based polymers; poly(phenyl sulfide)-based polymers; vinyl alcohol-based polymers; vinylidene chloride-based polymers; vinyl butyral-based polymers; acrylate-based polymers; polyoxymethylene-based polymers; epoxy-based polymers; and blends of two or more of these polymers. Examples of the protective film further include cured layers formed from thermosetting or ultraviolet-curable resins such as acryl-based, urethane-based, acryl-urethane-based, epoxy-based, and silicone-based resins. Especially preferred of these are films made of triacetyl cellulose.

The transparent protective film preferably is one which, when an in-plane direction of the film parallel to the slow axis of the protective film is referred to as the x axis, an in-plane direction of the film perpendicular to the x axis is referred to as the y axis, and an out-of-plane direction of the film perpendicular to the x axis is referred to as the z axis, has an in-plane retardation (Re2) as represented by the following equation (3) of 10 nm or less and an out-of-plane retardation (Rth) as represented by the following equation (4) of 40-100 nm, provided that nx2, ny2, and nz2 are the x-axis-direction refractive index, y-axis-direction refractive index, and z-axis-direction refractive index, respectively, and d2 is the thickness of the film.

$$Re2=(nx2-ny2)\times d2 \quad (3)$$

$$Rth=\{(nx2+ny2)/2-nz2\}\times d2 \quad (4)$$

That side of the transparent protective film which is not in contact with the polarizer, i.e., a surface of the polarizing plate, may contain additives, such as a heat stabilizer and an ultraviolet absorber, and a plasticizer according to need as long as this does not depart from the objects of the invention. The plasticizer and additives to be used can be known ones for use with resin materials. That side of the protective film may have undergone a hard coat treatment, antireflection treatment, anti-tack treatment, or a treatment for imparting diffusing or antiglare properties. The hard coat treatment is a treatment conducted for the purpose of preventing the polarizing-plate surface from being marred. A known hard coating material can be used. The antireflection treatment is a treatment conducted for the purpose of preventing external light from reflecting on the polarizing plate surface. This treatment can be accomplished by forming a known antireflection film. The anti-tack treatment is conducted for the purpose of preventing adhesion to an adjacent layer. Furthermore, the antiglare treatment is conducted for the purpose of preventing external light from reflecting on the polarizing plate surface to reduce the visibility of the light which has passed through the polarizing plate. This treatment can be accomplished by forming an antiglare layer by imparting a finely roughened structure on the surface of the transparent protective film by a suitable technique such as a known surface-roughening method, e.g., sandblasting or embossing, or the incorporation of transparent fine particles. The antiglare layer may be one which functions also as a diffusion layer for diffusing the light which has passed through the polarizing plate and thereby widening the viewing angle. Besides being formed as constituent layers in the transparent protective film, such layers including the antireflection layer, anti-tack layer, diffusion layer, and antiglare layer may be separately formed as optical functional films and stacked on the transparent protective film.

For adhering the polarizer to the transparent protective film, use can be made of an isocyanate-based adhesive, poly(vinyl alcohol)-based adhesive, gelatin-based adhesive, vinyl-based adhesive, latex-based adhesive, water-based polyester, or the like.

Figure 2:
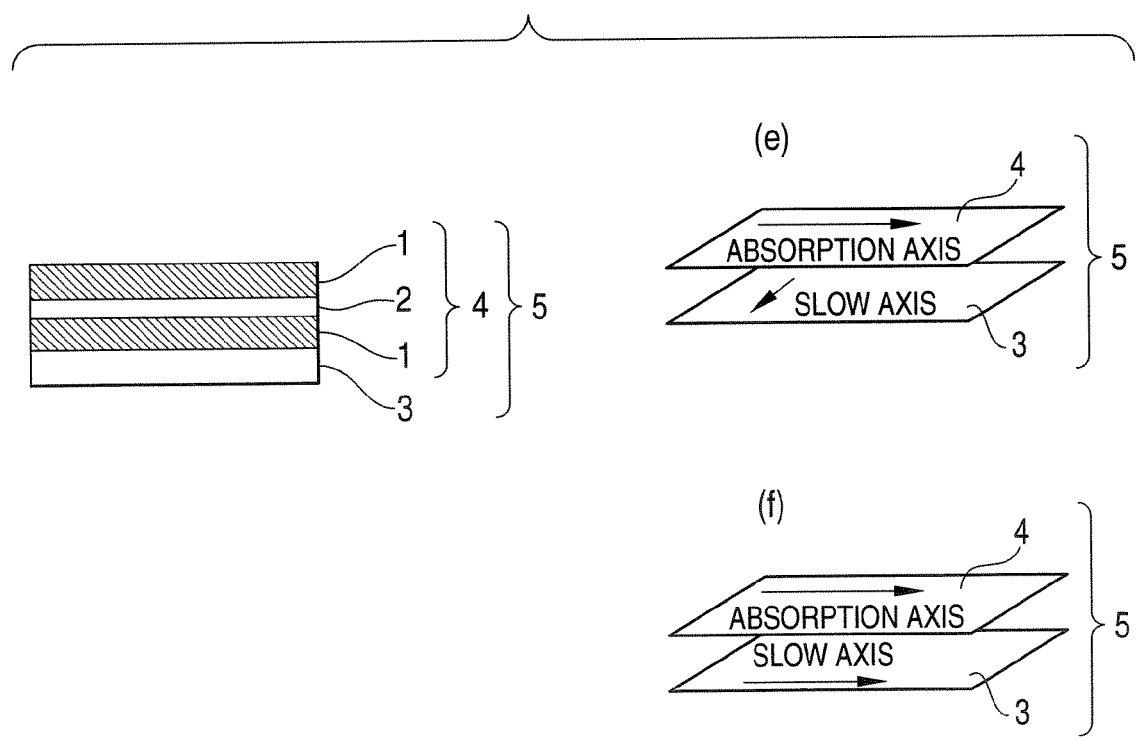
FIG. 2 includes a sectional view of a wide-viewing angle compensation film according to the invention.

The wide-viewing angle compensation film of the invention comprises the optical compensation film exhibiting negative birefringence and the polarizing plate stacked thereon so that the slow axis of the optical compensation film is perpendicular or parallel to the absorption axis of the polarizing plate. In FIG. 2 is shown a sectional view of a wide-viewing angle compensation film according to the invention. In FIG. 2, numeral 1 denotes a transparent protective film, 2 a polarizer, 3 an optical compensation film exhibiting negative birefringence, 4 a polarizing plate, and 5 a wide-viewing angle compensation film of the invention. Furthermore, (e) in FIG. 2 shows a wide-viewing angle compensation film in which the optical compensation film and the polarizing plate have been stacked so that the slow axis of the former is perpendicular to the absorption axis of the latter; and (f) shows a wide-viewing angle compensation film in which the optical compensation film and the polarizing plate have been stacked so that the slow axis of the former is parallel to the absorption axis of the latter.

There are no particular limitations on methods of laminating in stacking the optical compensation film and the polarizing plate to produce the wide-viewing angle compensation film of the invention. Examples of laminating techniques include: a method in which the film and plate are adhered to each other with an adhesive comprising, e.g., an acryl-based polymer, urethane-based polymer or an aqueous poly(vinyl alcohol) solution; and a method in which the film and plate are laminated to each other with, e.g., a pressure-sensitive adhesive comprising a polymer such as an acryl-based polymer, silicone-based polymer, polyester, polyurethane, polyamide, polyether, fluorine-based polymer, or rubber-based polymer as the base polymer. The wide-viewing angle compensation film may be one to which ultraviolet-absorbing performance has been imparted by, e.g., conducting a treatment with a known ultraviolet absorber.

The wide-viewing angle compensation film of the invention can be used as a compensation film capable of improving the image quality of a transmission type liquid-crystal display such as, e.g., TN-LCD, STN-LCD, TFT-TN-LCD, VA-LCD, or IPS-LCD and widening the viewing angle thereof. In this case, a transmission type liquid-crystal display comprising a pair of polarizing plates and a liquid-crystal cell interposed therebetween is modified by using the wide-viewing angle compensation film of the invention in place of the polarizing plate(s), whereby a transmission type liquid-crystal display having a wide viewing angle can be obtained. More specifically, the wide-viewing angle compensation film of the invention can be used in a transmission type liquid-crystal display comprising a liquid-crystal cell and the wide-viewing angle compensation film of the invention disposed on at least one side of the cell, and in a transmission type liquid-crystal display which comprises a liquid-crystal cell, the wide-viewing angle compensation film of the invention disposed on one side of the cell, and a polarizing plate disposed on the other side of the cell so that the absorption axis thereof is perpendicular to the absorption axis of the polarizing plate as a component of the wide-viewing angle compensation film.

Figure 3:
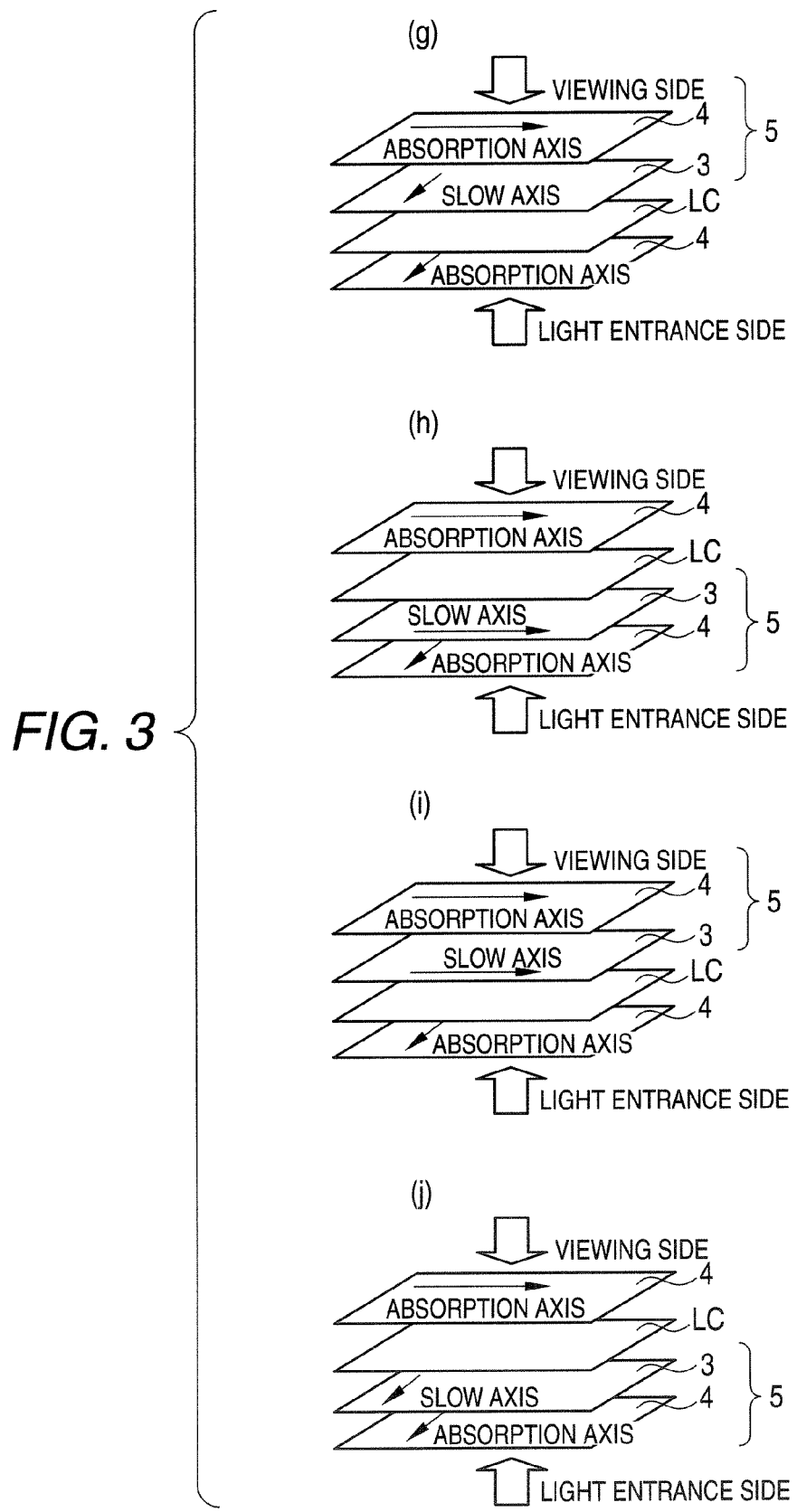
FIG. 3 are diagrammatic views illustrating transmission type liquid-crystal displays employing a wide-viewing angle compensation film according to the invention.

FIG. 3 shows diagrammatic views of transmission type liquid-crystal displays employing a wide-viewing angle compensation film according to the invention. In FIG. 3, numeral 3 denotes an optical compensation film exhibiting negative birefringence, 4 a polarizing plate, and 5 a wide-viewing angle compensation film of the invention. Furthermore, (g) in FIG. 3 shows a transmission type liquid-crystal display including, disposed on the viewing side, a wide-viewing angle compensation film 5 comprising a polarizing plate 4 and an optical compensation film stacked thereon so that the absorption axis of the former is perpendicular to the slow axis of the latter; (h) shows a transmission type liquid-crystal display including, disposed on the light entrance side, a wide-viewing angle compensation film 5 comprising a polarizing plate 4 and an optical compensation film stacked thereon so that the absorption axis of the former is perpendicular to the slow axis of the latter; (i) shows a transmission type liquid-crystal display including, disposed on the viewing side, a wide-viewing angle compensation film 5 comprising a polarizing plate 4 and an optical compensation film stacked thereon so that the absorption axis of the former is parallel to the slow axis of the latter; and (j) shows a transmission type liquid-crystal display including, disposed on the light entrance side, a wide-viewing angle compensation film 5 comprising a polarizing plate 4 and an optical compensation film stacked thereon so that the absorption axis of the former is parallel to the slow axis of the latter. These transmission type liquid-crystal displays (g) to (j) have a constitution in which the absorption axis of the polarizing plate as a component of the wide-viewing angle compensation film is perpendicular to the absorption axis of the other polarizing plate and the wide-viewing angle compensation film has been disposed so that the optical compensation film exhibiting negative birefringence faces the liquid-crystal cell. Thus, even when these displays are viewed from a direction which is oblique to the optical axis for the polarizing plates and is different from the directions of the absorption axes of the polarizing plates, a reduction in light leakage is attained. A wide viewing angle can hence be obtained.

The wide-viewing angle compensation film of the invention is suitable for use as an optical compensation member for widening the viewing angle of a transmission type liquid-crystal display. Applications of the film of the invention are not limited to it, and the film can be extensively utilizable for optical compensation intended to improve image quality, such as viewing angle enlargement and hue improvement.

The invention provides a wide-viewing angle compensation film which has excellent heat resistance and can compensate for the axial shifting of polarizing plates for use in a transmission type liquid-crystal display to thereby widen the viewing angle. The invention further provides a transmission type liquid-crystal display employing this wide-viewing angle compensation film.

The invention will be explained below in detail by reference to Examples, but the invention should not be construed as being limited to these Examples.

In the Examples, property examinations were made by the following methods.

—Determination of Weight-Average Molecular Weight and Number-Average Molecular Weight—

An elution curve was obtained through examination with a gel permeation chromatograph (GPC) (trade name, HLC-802A; manufactured by Tosoh Corp.). From this curve were determined the weight-average molecular weight (Mw) and number-average molecular weight (Mn) as values calculated for standard polystyrene. The molecular-weight distribution (Mw/Mn), which is a ratio between these, was further determined.

—Measurement of Glass Transition Temperature—

Measurement was made with a differential scanning calorimeter (trade name, DSC 2000; manufactured by Seiko Instrument Inc.) at a heating rate of 10° C./min.

—Measurement of Light Transmittance—

Light transmittance was measured as one evaluation item of transparency in accordance with JIS K 7361-1 (1997).

—Measurement of Haze—

Haze was measured as one evaluation item of transparency in accordance with JIS K 7136 (2000).

—Measurement of Refractive Index—

Measurement was made in accordance with JIS K 7142 (1981).

—Judgment as to Positiveness or Negativeness of Birefringence—

Birefringence was judged positive or negative by the additive color judgment method with a λ/4 plate using the polarization microscope described in Kôbunshi Sozai No Henkôkenbikyô Nyûmon (written by Hiroshi Awaya, published by Agune Gijutsu Center, Chapter 5, pp. 78-82 (2001)).

—Measurement of Three-Dimensional Refractive Indices and Calculation of Retardation and Orientation Parameter—

Three-dimensional refractive indices were measured with a sample inclination type automatic birefringence analyzer (trade name, KOBRA-WR; manufactured by Oji Scientific Instruments) by examining a sample while varying the angle of evaluation. Furthermore, the in-plane retardations of a film Re1 and Re2, out-of-plane retardation of a film Rth, and orientation parameter Nz were calculated from the three-dimensional refractive indices.

—Examination of Effect of Viewing Angle Compensation—

A wide-viewing angle compensation film was examined for the effect of viewing angle compensation with a UV-visible light spectrophotometer (trade name, UVIDEC-650; manufactured by Japan Spectroscopic Co., Ltd.) at visible-range wavelengths of 450 nm, 500 nm, 550 nm, 600 nm, 650 nm, and 700 nm. In this examination, the spectrophotometer was disposed so as to have an azimuth of 45° with the absorption axis of the polarizing plate and an angle of elevation of 60° with the normal-line direction. For determining the effect of viewing angle compensation, the amount of light leakage in the case of using the wide-viewing angle compensation film as a polarizer and disposing an analyzer in the crossed nicol was measured.

PREPARATION EXAMPLE 1

Preparation of Polarizing Plate 1

A film having a thickness of 20 μm obtained by adsorbing iodine onto a poly(vinyl alcohol) film and then stretching the film was used as a polarizer. A triacetyl cellulose film having a thickness of 80 μm was laminated as a transparent protective film to each side of the polarizer to prepare a polarizing plate 1. The transparent protective film had an in-plane retardation Re2 of 1 nm and an out-of-plane retardation Rth of 69 nm.

SYNTHESIS EXAMPLE 1

Synthesis of N-Phenylmaleimide/Isobutene Copolymer

Into a 1-L autoclave were introduced 400 mL of toluene as a polymerization solvent, 0.001 mol of perbutyl neodecanoate as a polymerization initiator, 0.42 mol of N-phenylmaleimide, and 4.05 mol of isobutene. The monomers were polymerized under the polymerization conditions of a polymerization temperature of 60° C. and a polymerization time of 5 hours. Thus, an N-phenylmaleimide/isobutene copolymer (weight-average molecular weight (Mw), 162,000; molecular-weight distribution (Mw/Mn) represented by weight-average molecular weight (Mw)/number-average molecular weight (Mn), 2.6) was obtained.

FILM PRODUCTION EXAMPLE 1

A blend of 50% by weight the N-phenylmaleimide/isobutene copolymer obtained in Synthesis Example 1 and 50% by weight acrylonitrile/styrene copolymer (trade name, Cevian N050; manufactured by Daicel Polymer Ltd.; weight-average molecular weight (Mw), 130,000; acrylonitrile units/styrene units (weight ratio), 24.5:75.5) was prepared. A methylene chloride solution thereof was prepared so as to have a concentration of the blend of 25% by weight. This methylene chloride solution was cast on a poly(ethylene terephthalate) film (hereinafter abbreviated as PET film). The solvent was volatilized to solidify the cast, which was peeled off to obtain a film. The film peeled off was dried at 100° C. for 4 hours and then further dried by elevating the temperature from 110° C. to 130° C. at an interval of 10° C. while holding the film at each temperature for 1 hour. Thereafter, the film was dried with a vacuum dryer at 120° C. for 4 hours to obtain a film having a thickness of about 100 μm (hereinafter referred to as film (1)).

The film (1) obtained had a light transmittance of 92%, haze of 0.3%, refractive index of 1.5726, and glass transition temperature (Tg) of 137° C.

FILM PRODUCTION EXAMPLE 2

A blend of 50% by weight the N-phenylmaleimide/isobutene copolymer obtained in Synthesis Example 1 and 50% by weight acrylonitrile/styrene copolymer (trade name, Stylac AS 727; manufactured by Asahi Chemical; weight-average molecular weight (Mw), 128,000; acrylonitrile units/styrene units (weight ratio), 37.5:62.5) was prepared. The blend was melt-kneaded with a twin-screw extruder (trade name, Labo Plastomill; manufactured by Toyo Seiki Seisaku-Sho) having cylinder temperatures set at 140-240° C. to obtain pellets. Using a twin-screw extruder (trade name, Labo Plastomill; manufactured by Toyo Seiki Seisaku-Sho) having cylinder temperatures set at 200-270° C. and equipped with a die for film formation, a film having a thickness of about 120 μm (hereinafter referred to as film (2)) was obtained.

The film (2) obtained had a light transmittance of 90%, haze of 0.9%, refractive index of 1.5710, and glass transition temperature (Tg) of 150° C.

FILM PRODUCTION EXAMPLE 3

A methylene chloride solution was prepared which consisted of 25% by weight polycarbonate (trade name, Panlite L1225; manufactured by Teijin Ltd.) and 75% by weight methylene chloride. This methylene chloride solution was cast on a PET film. The solvent was volatilized to solidify the cast, which was peeled off to obtain a film. The film peeled off was dried at 100° C. for 4 hours and then further dried by elevating the temperature from 110° C. to 130° C. at an interval of 10° C. while holding the film at each temperature for 1 hour. Thereafter, the film was dried with a vacuum dryer at 120° C. for 4 hours to obtain a film having a thickness of about 100 μm (hereinafter referred to as film (3)).

The film (3) obtained had a light transmittance of 91.5%, haze of 0.6%, refractive index of 1.5830, and glass transition temperature (Tg) of 150° C.

EXAMPLE 1

A small piece of 5 cm×5 cm was cut out of the film (1) obtained in Film Production Example 1. This piece was subjected to free-width uniaxial stretching with a biaxially stretching machine (manufactured by Imoto Seisakusho) under the conditions of a temperature of 145° C. and a stretching rate of 100 mm/min. The piece was thus stretched by +100% to thereby obtain an optical compensation film (hereinafter referred to as stretched film (1a)).

The stretched film (1a) obtained exhibited negative birefringence and had an in-plane retardation of the film Re1 of 220 nm and an orientation parameter Nz of 0.00. Furthermore, the stretched film (1a) was laminated to a polarizing plate 1 with a pressure-sensitive adhesive so that the slow axis of the film (1a) was parallel to the absorption axis of the plate 1. Thus, a wide-viewing angle compensation film was obtained.

The results of an examination of this wide-viewing angle compensation film for the effect of viewing angle compensation are shown in Table 1. The amounts of light leakage with respect to the lights having wavelengths of 450-700 nm were evenly small, and a sufficient extinction state could be obtained. The film showed the excellent effect of compensation to attain a wide viewing angle.

EXAMPLE 2

A wide-viewing angle compensation film was obtained in the same manner as in Example 1, except that the stretched film (1a) and the polarizing plate 1 were arranged so that the slow axis of the former and the absorption axis of the latter were not parallel but perpendicular to each other.

The results of an examination of this wide-viewing angle compensation film for the effect of viewing angle compensation are shown in Table 1. The amounts of light leakage with respect to the lights having wavelengths of 450-700 nm were evenly small, and a sufficient extinction state could be obtained. The film showed the excellent effect of compensation to attain a wide viewing angle.

EXAMPLE 3

A small piece of 5 cm×5 cm was cut out of the film (1) obtained in Film Production Example 1. This piece was subjected to free-width uniaxial stretching with a biaxially stretching machine (manufactured by Imoto Seisakusho) under the conditions of a temperature of 148° C. and a stretching rate of 100 mm/min. The piece was thus stretched by +100% to thereby obtain an optical compensation film (hereinafter referred to as stretched film (1b)).

The stretched film (1b) obtained exhibited negative birefringence and had an in-plane retardation of the film Re1 of 191 nm and an orientation parameter Nz of −0.01. Furthermore, the stretched film (1b) was laminated to a polarizing plate 1 with a pressure-sensitive adhesive so that the slow axis of the film (1b) was parallel to the absorption axis of the plate 1. Thus, a wide-viewing angle compensation film was obtained.

The results of an examination of this wide-viewing angle compensation film for the effect of viewing angle compensation are shown in Table 1. The amounts of light leakage with respect to the lights having wavelengths of 450-700 nm were evenly small, and a sufficient extinction state could be obtained. The film showed the excellent effect of compensation to attain a wide viewing angle.

EXAMPLE 4

A small piece of 5 cm×5 cm was cut out of the film (1) obtained in Film Production Example 1. This piece was subjected to free-width uniaxial stretching with a biaxially stretching machine (manufactured by Imoto Seisakusho) under the conditions of a temperature of 150° C. and a stretching rate of 100 mm/min. The piece was thus stretched by +100% to thereby obtain an optical compensation film (hereinafter referred to as stretched film (1c)).

The stretched film (1c) obtained exhibited negative birefringence and had an in-plane retardation of the film Re1 of 177 nm and an orientation parameter Nz of 0.00. Furthermore, the stretched film (1c) was laminated to a polarizing plate 1 with a pressure-sensitive adhesive so that the slow axis of the film (1c) was parallel to the absorption axis of the plate 1. Thus, a wide-viewing angle compensation film was obtained.

The results of an examination of this wide-viewing angle compensation film for the effect of viewing angle compensation are shown in Table 1. The amounts of light leakage with respect to the lights having wavelengths of 450-700 nm were evenly small, and a sufficient extinction state could be obtained. The film showed the excellent effect of compensation to attain a wide viewing-angle.

EXAMPLE 5

A small piece of 5 cm×5 cm was cut out of the film (1) obtained in Film Production Example 1. This piece was subjected to free-width uniaxial stretching with a biaxially stretching machine (manufactured by Imoto Seisakusho) under the conditions of a temperature of 152° C. and a stretching rate of 100 mm/min. The piece was thus stretched by +100% to thereby obtain an optical compensation film (hereinafter referred to as stretched film (1d)).

The stretched film (1d) obtained exhibited negative birefringence and had an in-plane retardation of the film Re1 of 142 nm and an orientation parameter Nz of 0.00. Furthermore, the stretched film (1d) was laminated to a polarizing plate 1 with a pressure-sensitive adhesive so that the slow axis of the film (1d) was parallel to the absorption axis of the plate 1. Thus, a wide-viewing angle compensation film was obtained.

The results of an examination of this wide-viewing angle compensation film for the effect of viewing angle compensation are shown in Table 1. The amounts of light leakage with respect to the lights having wavelengths of 450-700 nm were evenly small, and a sufficient extinction state could be obtained. The film showed the excellent effect of compensation to attain a wide viewing angle.

EXAMPLE 6

A small piece of 5 cm×5 cm was cut out of the film (1) obtained in Film Production Example 1. This piece was subjected to free-width uniaxial stretching with a biaxially stretching machine (manufactured by Imoto Seisakusho) under the conditions of a temperature of 155° C. and a stretching rate of 100 mm/min. The piece was thus stretched by +100% to thereby obtain an optical compensation film (hereinafter referred to as stretched film (1e)).

The stretched film (1e) obtained exhibited negative birefringence and had an in-plane retardation of the film Re1 of 113 nm and an orientation parameter Nz of −0.04. Furthermore, the stretched film (1e) was laminated to a polarizing plate 1 with a pressure-sensitive adhesive so that the slow axis of the film (1e) was parallel to the absorption axis of the plate 1. Thus, a wide-viewing angle compensation film was obtained.

The results of an examination of this wide-viewing angle compensation film for the effect of viewing angle compensation are shown in Table 1. The amounts of light leakage with respect to the lights having wavelengths of 450-700 nm were evenly small, and a sufficient extinction state could be obtained. The film showed the excellent effect of compensation to attain a wide viewing angle.

EXAMPLE 7

A small piece of 5 cm×5 cm was cut out of the film (1) obtained in Film Production Example 1. This piece was subjected to free-width uniaxial stretching with a biaxially stretching machine (manufactured by Imoto Seisakusho) under the conditions of a temperature of 157° C. and a stretching rate of 30 mm/min. The piece was thus stretched by +100% to thereby obtain an optical compensation film (hereinafter referred to as stretched film (1f)).

The stretched film (1f) obtained exhibited negative birefringence and had an in-plane retardation of the film Re1 of 66 nm and an orientation parameter Nz of 0.00. Furthermore, the stretched film (1f) was laminated to a polarizing plate 1 with a pressure-sensitive adhesive so that the slow axis of the film (1f) was parallel to the absorption axis of the plate 1. Thus, a wide-viewing angle compensation film was obtained.

The results of an examination of this wide-viewing angle compensation film for the effect of viewing angle compensation are shown in Table 1. The amounts of light leakage with respect to the lights having wavelengths of 450-700 nm were evenly small, and a sufficient extinction state could be obtained. The film showed the excellent effect of compensation to attain a wide viewing angle.

EXAMPLE 8

A small piece of 5 cm×5 cm was cut out of the film (2) obtained in Film Production Example 2. This piece was subjected to free-width uniaxial stretching with a biaxially stretching machine (manufactured by Imoto Seisakusho) under the conditions of a temperature of 165° C. and a stretching rate of 90 mm/min. The piece was thus stretched by +100% to thereby obtain an optical compensation film (hereinafter referred to as stretched film (1g)).

The stretched film (1g) obtained exhibited negative birefringence and had an in-plane retardation of the film Re1 of 166 nm and an orientation parameter Nz of 0.00. Furthermore, the stretched film (1g) was laminated to a polarizing plate 1 with a pressure-sensitive adhesive so that the slow axis of the film (1g) was parallel to the absorption axis of the plate 1. Thus, a wide-viewing angle compensation film was obtained.

The results of an examination of this wide-viewing angle compensation film for the effect of viewing angle compensation are shown in Table 1. The amounts of light leakage with respect to the lights having wavelengths of 450-700 nm were evenly small, and a sufficient extinction state could be obtained. The film showed the excellent effect of compensation to attain a wide viewing angle.

COMPARATIVE EXAMPLE 1

Using a polarizing plate only and without using any optical compensation film exhibiting negative birefringence, an examination for the effect of viewing angle compensation was conducted.

The results of the examination are shown in Table 1. The amounts of light leakage with respect to the lights having wavelengths of 450-700 nm were large, and a sufficient extinction state could not be obtained. It was difficult to secure a satisfactory viewing angle.

COMPARATIVE EXAMPLE 2

A small piece of 5 cm×5 cm was cut out of the film (1) obtained in Film Production Example 1. This piece was subjected to free-width uniaxial stretching with a biaxially stretching machine (manufactured by Imoto Seisakusho) under the conditions of a temperature of 144° C. and a stretching rate of 120 mm/min. The piece was thus stretched by +100% to thereby obtain an optical compensation film (hereinafter referred to as stretched film (1h)).

The stretched film (1h) obtained exhibited negative birefringence and had an in-plane retardation of the film Re1 of 285 nm and an orientation parameter Nz of 0.01. Furthermore, the stretched film (1h) was laminated to a polarizing plate 1 with a pressure-sensitive adhesive so that the slow axis of the film (1h) was parallel to the absorption axis of the plate 1. Thus, a film was obtained.

The results of an examination of this film for the effect of viewing angle compensation are shown in Table 1. The amounts of light leakage with respect to the lights having wavelengths of 450-550 nm were large and a sufficient extinction state could not be obtained. It was difficult to secure a satisfactory viewing angle.

COMPARATIVE EXAMPLE 3

A film was obtained in the same manner as in Example 4, except that the stretched film (1c) and the polarizing plate 1 were laminated to each other with a pressure-sensitive adhesive so that the slow axis of the stretched film (1c) was not parallel to the absorption axis of the polarizing plate 1 but formed an angle of 10° with the absorption axis of the polarizing plate 1.

The results of an examination of this film for the effect of viewing angle compensation are shown in Table 1. The amounts of light leakage with respect to the lights having wavelengths of 450-700 nm were large, and a sufficient extinction state could not be obtained. It was difficult to secure a satisfactory viewing angle.

COMPARATIVE EXAMPLE 4

A small piece of 5 cm×5 cm was cut out of the film (1) obtained in Film Production Example 1. This piece was subjected to free-width uniaxial stretching with a biaxially stretching machine (manufactured by Imoto Seisakusho) under the conditions of a temperature of 152° C. and a stretching rate of 105 mm/min. The piece was thus stretched by +100% to thereby obtain an optical compensation film (hereinafter referred to as stretched film (1i)).

The stretched film (1i) obtained exhibited negative birefringence and had an in-plane retardation of the film Re1 of 132 nm and an orientation parameter Nz of −0.03.

On the other hand, a small piece of 5 cm×5 cm was cut out of the film (3) obtained in Film Production Example 3. This piece was subjected to free-width uniaxial stretching with a biaxially stretching machine (manufactured by Imoto Seisakusho) under the conditions of a temperature of 180° C. and a stretching rate of 10 mm/min. The piece was thus stretched by +10% to thereby obtain an optical compensation film (hereinafter referred to as stretched film (3a)).

The stretched film (3a) obtained exhibited positive birefringence and had an in-plane retardation of the film Re1 of 59 nm and an orientation parameter Nz of 1.03.

The stretched film (1i) and the stretched film (3a) were stacked so that the slow axes of these were parallel to each other. Thus, a laminate film was obtained. This laminate film had an in-plane retardation of the film Re1 of 189 nm and an orientation parameter Nz of 0.31. Furthermore, this laminate film was laminated to a polarizing plate 1 with a pressure-sensitive adhesive so that the slow axis of the laminate film was parallel to the absorption axis of the plate 1. Thus, a film was obtained.

The results of an examination of this film for the effect of viewing angle compensation are shown in Table 1. The amounts of light leakage with respect to the lights having wavelengths of 450-700 nm were large and a sufficient extinction state could not be obtained. It was difficult to secure a satisfactory viewing angle.

COMPARATIVE EXAMPLE 5

A small piece of 5 cm×5 cm was cut out of the film (3) obtained in Film Production Example 3. This piece was subjected to free-width uniaxial stretching with a biaxially stretching machine (manufactured by Imoto Seisakusho) under the conditions of a temperature of 175° C. and a stretching rate of 5 mm/min. The piece was thus stretched by +10% to thereby obtain an optical compensation film (hereinafter referred to as stretched film (3b)).

The stretched film (3b) obtained exhibited positive birefringence and had an in-plane retardation of the film Re1 of 176 nm and an orientation parameter Nz of 0.96. Furthermore, the stretched film (3b) was laminated to a polarizing plate 1 with a pressure-sensitive adhesive so that the slow axis of the film (3b) was parallel to the absorption axis of the plate 1. Thus, a film was obtained.

The results of an examination of this film for the effect of viewing angle compensation are shown in Table 1. The amounts of light leakage with respect to the lights having wavelengths of 450-700 nm were large, and a sufficient extinction state could not be obtained. It was difficult to secure a satisfactory viewing angle.

TABLE 1

| Measuring wavelength | 450 nm | 500 nm | 550 nm | 600 nm | 650 nm | 700 nm |
| --- | --- | --- | --- | --- | --- | --- |
| Example 1 | 0.9% | 0.4% | 0.3% | 0.2% | 0.2% | 0.3% |
| Example 2 | 0.9% | 0.5% | 0.3% | 0.2% | 0.2% | 0.3% |

TABLE 1-continued

| Measuring wavelength | 450 nm | 500 nm | 550 nm | 600 nm | 650 nm | 700 nm |
|---|---|---|---|---|---|---|
| Example 3 | 0.8% | 0.4% | 0.4% | 0.4% | 0.4% | 0.6% |
| Example 4 | 0.6% | 0.3% | 0.3% | 0.3% | 0.4% | 0.5% |
| Example 5 | 0.4% | 0.4% | 0.5% | 0.5% | 0.6% | 0.7% |
| Example 6 | 0.6% | 0.7% | 0.8% | 0.8% | 0.8% | 0.9% |
| Example 7 | 0.9% | 0.9% | 0.9% | 0.8% | 0.9% | 0.9% |
| Example 8 | 0.5% | 0.4% | 0.4% | 0.4% | 0.5% | 0.6% |
| Comparative Example 1 | 2.0% | 2.0% | 1.8% | 1.6% | 1.6% | 1.7% |
| Comparative Example 2 | 2.9% | 2.1% | 1.3% | 0.9% | 0.6% | 0.6% |
| Comparative Example 3 | 2.2% | 2.1% | 1.9% | 1.9% | 2.0% | 2.1% |
| Comparative Example 4 | 2.0% | 1.9% | 1.8% | 1.6% | 1.7% | 1.9% |
| Comparative Example 5 | 2.6% | 3.1% | 3.0% | 2.9% | 2.8% | 2.9% |

While the invention has been described in detail and with reference to specific embodiments thereof, it will be apparent to one skilled in the art that various changes and modifications can be made therein without departing from the spirit and scope thereof.

What is claimed is:

1. A wide-viewing angle compensation film, comprising:
   (i) an optical compensation film which comprises
      (a) 20-95% by weight an N-phenylmaleimide/isobutene copolymer (a) which has a weight-average molecular weight as calculated for standard-polystyrene of $5 \times 10^3 - 5 \times 10^6$, and
      (b) 80-5% by weight an acrylonitrile/styrene copolymer in which a proportion of acrylonitrile residual units to styrene residue units is from 20:80 to 50:50 (by weight) and which has a weight-average molecular weight as calculated for standard polystyrene of $5 \times 10^3 - 5 \times 10^6$,
   wherein said optical compensation film exhibits negative birefringence and has an in-plane retardation (Re1) as represented by the following equation (1) of 60-220 nm and an orientation parameter (Nz) as represented by the following equation (2) in the range of 0±0.05 and has a glass transition temperature of 130° C. or higher; and
   (ii) a polarizing plate which comprises a polarizer and, stacked on both sides thereof, a transparent protective film comprising triacetvl cellulose and satisfying the requirements that an in-plane retardation (Re2) as represented by the following equation (3) is 10 nm or less and an out-of-plane retardation (Rth) as represented by the following equation (4) of 40-100 nm so that the slow axis of the optical compensation film showing the negative birefringence is perpendicular or parallel to the absorption axis of the polarizing plate:

$$Re1 = (nx1 - ny1) \times d1 \quad (1)$$

$$Nz = (nx1 - nz1)/(nx1 - ny1) \quad (2)$$

wherein nx1, ny1, and nz1 respectively represent the x-axis-direction refractive index, y-axis-direction refractive index, and z-axis-direction refractive index of the optical compensation film, provided that the x axis is an in-plane direction of the film parallel to the slow axis of the film, the y axis is an in-plane direction of the film perpendicular to the x axis and the z axis is an out-of-plane direction of the film perpendicular to the x axis; and d1 represents the thickness of the optical compensation film:

$$Re2 = (nx2 - ny2) \times d2 \quad (3)$$

$$Rth = ((nx2 + ny2)/2 - nz2) \times d2 \quad (4)$$

wherein nx2, ny2 and nz2 respectively represent the x-axis-direction refractive index, y-axis-direction refractive index and z-axis-direction refractive index of the transparent protective film, provided that the x axis is an in-plane direction of the film parallel to the slow axis of the film, the y axis is an in-plane direction of the film perpendicular to the x axis and the z axis is an out-of-plane direction of the film perpendicular to the x axis; and d2 represents the thickness of the transparent protective film; and wherein a relationship among the three-dimensional refractive indices of said optical compensation film satisfies $nx1 \geq nz1 > ny1$.

2. The wide-viewing angle compensation film of claim 1, wherein the optical compensation film is a uniaxially stretched film and/or a biaxially stretched film.

3. A transmission liquid-crystal display which comprises a liquid-crystal cell and the wide-viewing angle compensation film of claim 1 disposed on at least one side of the cell.

4. A transmission liquid-crystal display which comprises a liquid-crystal cell and two polarizing plates disposed respectively on both sides of the cell so that the absorption axis of one of the polarizing plates is perpendicular to that of the other, wherein at least one of the polarizing plates is the wide-viewing angle compensation film of claim 1.

* * * * *